United States Patent
Kim et al.

(10) Patent No.: US 9,942,015 B2
(45) Date of Patent: Apr. 10, 2018

(54) OFDMA INDICATION AND COMMUNICATION IN WLANS

(71) Applicant: Apple Inc., Cupertino, CA (US)

(72) Inventors: Joonsuk Kim, Saratoga, CA (US); Guoqing Li, Cupertino, CA (US); Chiu Ngok E. Wong, San Jose, CA (US)

(73) Assignee: Apple Inc., Cupertino, CA (US)

( * ) Notice: Subject to any disclaimer, the term of this patent is extended or adjusted under 35 U.S.C. 154(b) by 23 days.

(21) Appl. No.: 14/989,924

(22) Filed: Jan. 7, 2016

(65) Prior Publication Data

US 2016/0205686 A1    Jul. 14, 2016

Related U.S. Application Data

(60) Provisional application No. 62/101,913, filed on Jan. 9, 2015.

(51) Int. Cl.
| | | |
|---|---|---|
| *H04W 72/04* | (2009.01) | |
| *H04L 5/00* | (2006.01) | |
| *H04W 56/00* | (2009.01) | |
| *H04L 25/02* | (2006.01) | |
| *H04L 1/12* | (2006.01) | |
| *H04L 27/26* | (2006.01) | |
| *H04W 84/12* | (2009.01) | |

(52) U.S. Cl.
CPC .............. *H04L 5/0048* (2013.01); *H04L 1/12* (2013.01); *H04L 25/0202* (2013.01); *H04L 27/2656* (2013.01); *H04L 27/2657* (2013.01); *H04L 27/2675* (2013.01); *H04W 56/002* (2013.01); *H04L 5/0023* (2013.01); *H04W 84/12* (2013.01)

(58) Field of Classification Search
CPC ............ H04W 72/0453; H04W 72/042; H04L 5/0007; H04L 5/0048
See application file for complete search history.

(56) References Cited

U.S. PATENT DOCUMENTS

| | | | |
|---|---|---|---|
| 7,693,111 B2 | 4/2010 | Sondur et al. | |
| 8,498,359 B2 | 7/2013 | Lauer et al. | |
| 2005/0169261 A1 | 8/2005 | Williams et al. | |
| 2007/0291702 A1* | 12/2007 | Nanba | H04J 3/00 370/336 |
| 2010/0260114 A1 | 10/2010 | Vermani et al. | |
| 2014/0369276 A1 | 12/2014 | Porat et al. | |
| 2015/0131517 A1* | 5/2015 | Chu | H04W 72/005 370/312 |
| 2015/0173070 A1* | 6/2015 | Aboul-Magd | H04L 5/0007 370/329 |

\* cited by examiner

*Primary Examiner* — Jamal Javaid
(74) *Attorney, Agent, or Firm* — Meyertons Hood Kivlin Kowert & Goetzel, P.C.; Jeffrey C. Hood

(57) ABSTRACT

This disclosure relates to orthogonal frequency division multiple access (OFDMA) communication in wireless local area networks (WLANs). According to some embodiments, an indication may be transmitted to receiving devices that a first frame is an OFDMA frame. Channel information indicating allocation of bandwidth portions of the first frame to respective receiving devices may also be transmitted to the receiving devices. The first frame may be transmitted to the receiving devices, including transmitting data to each respective receiving device on the bandwidth portion(s) allocated to the respective receiving device.

20 Claims, 7 Drawing Sheets

OFDMA INDICATION AND COMMUNICATION IN WLANS

PRIORITY INFORMATION

This application claims priority to U.S. provisional patent application Ser. No. 62/101,913, entitled "OFDMA Communication in WLANs," filed Jan. 9, 2015, which is hereby incorporated by reference in its entirety as though fully and completely set forth herein.

FIELD

The present application relates to wireless communication systems, including orthogonal frequency division multiple access (OFDMA) communication in wireless local area networks (WLANs).

DESCRIPTION OF THE RELATED ART

Wireless communication systems are rapidly growing in usage. For example, wireless local area network (WLAN) accessibility is expected in most communication devices. WLANs are also increasingly being used to offload communication from cellular networks and/or base stations. In view of the expected continued increase in WLAN deployment and usage, existing WLAN communication techniques may provide insufficient capacity and flexibility relative to demand. Accordingly, improvements in the field are desired.

SUMMARY

Embodiments described herein relate to devices, systems, and methods for orthogonal frequency division multiple access (OFDMA) communication in WLANs.

According to the techniques presented herein, it may be possible for multiple wireless devices to perform WLAN communication using OFDMA techniques. For example, by providing an indication (e.g., as part of an OFDMA frame and/or prior to an OFDMA frame) that a given frame is an OFDMA frame and providing information indicating how the bandwidth of the OFDMA frame is allocated to the various intended recipients of the OFDMA frame (and possibly other information such as MCS allocations for the various bandwidth portions), it may be possible for the intended recipients to prepare for and successfully receive their allocated portions of the OFDMA frame.

The techniques described herein may be implemented in and/or used with a number of different types of devices, including but not limited to access points, cellular base stations, smart phones, tablet computers, wearable computing devices, media players, set-top boxes, and any of various other computing devices capable of wireless communication.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
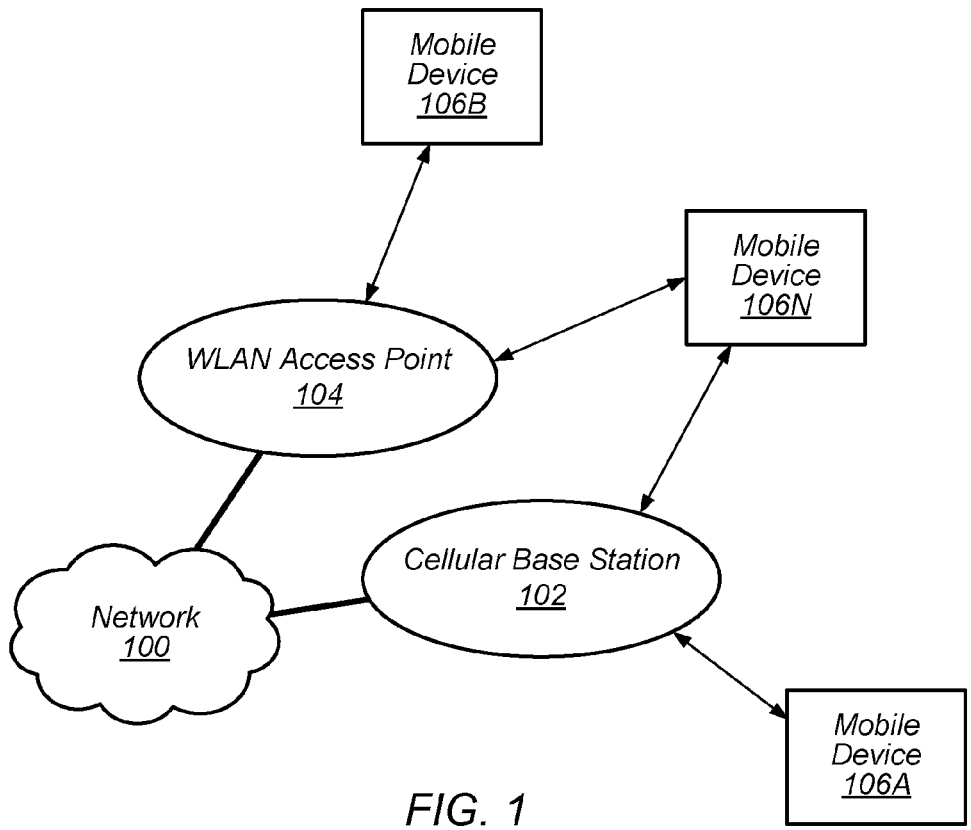
FIG. 1 illustrates an example (and simplified) wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

BS: Base Station
AP: Access Point
APN: Access Point Name
LTE: Long Term Evolution
RAT: Radio Access Technology
TX: Transmit
RX: Receive
WLAN: Wireless Local Area Network
I-WLAN: Interworking WLAN
SIP: Session Initiation Protocol
PDN: Packet Data Network
PGW: PDN Gateway
SGW: Signaling Gateway
ePDG: evolved Packet Data Gateway
GPRS: General Packet Radio Service

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Mobile Device—any of various types of communication devices which are mobile and are capable of communicating on a cellular network and a non-cellular network, such as WLAN. A UE is an example of a mobile device.

Base Station—The term "Base Station" has the full breadth of its ordinary meaning, and at least includes a wireless communication station installed at a fixed location and used to communicate as part of a wireless cellular telephone system or cellular radio system.

Access Point—The term "Access Point" has the full breadth of its ordinary meaning, and at least includes a wireless communication device which offers connectivity to a wireless local area network (WLAN), such as a Wi-Fi network.

WLAN—The term "WLAN" has the full breadth of its ordinary meaning, and at least includes a wireless local area network technology based on the IEEE (Institute of Electrical and Electronics Engineers) 802.11 standards, and future revisions or enhancements to those standards.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 20 MHz wide while a smaller bandwidth may be operated by populating a portion of the frequency tones within 20 MHz mask. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
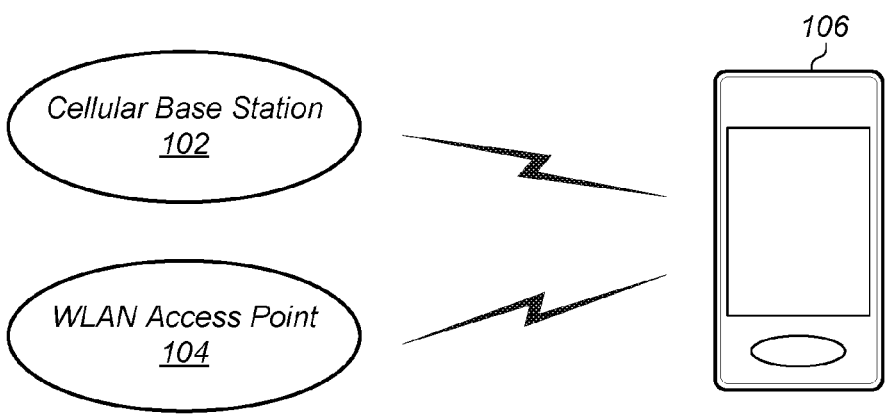
FIG. 2 illustrates an example mobile device in communication with a cellular base station and an access point (AP)

FIGS. 1 and 2—Communication System

FIG. 1 illustrates an exemplary (and simplified) wireless communication system. It is noted that the system of FIG. 1 is merely one example of a possible system, and embodiments of the disclosure may be implemented in any of various systems, as desired.

As shown, the example wireless communication system includes a cellular base station 102, which may communicate over a transmission medium with one or more mobile devices 106A, 106N. Each of the mobile devices may be, for example, a "user equipment" (UE) or other of various types of devices capable of wireless communication.

The base station 102 may be a base transceiver station (BTS) or cell site, and may include hardware that enables wireless cellular communication with any or all of the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the mobile devices and/or between the mobile devices and the network 100.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), WLAN, WiMAX etc. A typical wireless cellular communication system will include a plurality of cellular base stations which provide different coverage areas or cells, with handoffs between cells.

Additionally, the example wireless communication system may include one or more wireless access points (such as access point 104) that may be communicatively coupled to the network 100. Each wireless access point 104 may provide a wireless local area network (WLAN) for communication with any or all of mobile devices 106 (e.g., UE 106B, as shown). These wireless access points may comprise WLAN access points. Wireless access point 104 may be configured to support cellular network offloading and/or otherwise provide wireless communication services as part of the wireless communication system illustrated in FIG. 1.

1) Cellular base station 102 and other similar base stations and 2) access points (such as access point 104) operating according to a different wireless communication standard may thus be provided as a network which may provide continuous or nearly continuous overlapping service to any or all of the mobile devices 106 and similar devices over a geographic area via one or more wireless communication standards.

Thus, while base station 102 may act as a "serving cell" for a UE 106 as illustrated in FIG. 1, any or all of the mobile device 106 may also be capable of receiving signals from (and possibly within communication range of) one or more other cells (which might be provided by other base stations (not shown)) and/or wireless local area network (WLAN) access points, which may be referred to as "neighboring cells" or "neighboring WLANs" (e.g., as appropriate), and/or more generally as "neighbors". Further, two or more neighboring coverage areas may overlap to any degree.

FIG. 2 illustrates mobile device 106 (e.g., one of the devices 106A through 106N) in communication with both a WLAN access point 104 and a cellular base station 102. The mobile device 106 may be a device with both cellular communication capability and non-cellular communication capability, e.g., WLAN capability, such as a mobile phone, a hand-held device, a computer or a tablet, or any other type of wireless device configured to communicate over at least two radio access technologies.

The mobile device 106 may include a processor that is configured to execute program instructions stored in memory. The mobile device 106 may perform any of the method embodiments described herein by executing such stored instructions. Alternatively, or in addition, the mobile device 106 may include a programmable hardware element such as an FPGA (field-programmable gate array) that is configured to perform any of the method embodiments described herein, or any portion of any of the method embodiments described herein.

In some embodiments, the mobile device 106 may be configured to communicate using any of multiple radio access technologies/wireless communication protocols. For example, the mobile device 106 may be configured to communicate using any of various cellular communication technologies, such as GSM, UMTS, CDMA2000, LTE, LTE-A, etc. The mobile device may also be configured to communicate using any of various non-cellular communication technologies such as WLAN/Wi-Fi, or Bluetooth. Other combinations of wireless communication technologies are also possible.

The mobile device 106 may include one or more antennas for communicating using one or more wireless communication protocols or technologies. In one embodiment, the mobile device 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the mobile device 106 may share one or more parts of a receive and/or transmit chain between multiple wireless communication technologies, such as those discussed above.

In some embodiments, the mobile device 106 may include separate transmit and/or receive chains (e.g., including separate RF and/or digital radio components) for each wireless communication protocol with which it is configured to communicate. As a further possibility, the mobile device 106 may include one or more radios which are shared between multiple wireless communication protocols, and one or more radios which are used exclusively by a single wireless communication protocol. For example, the mobile device 106 might include a shared radio for communicating using either of LTE or 1×RTT (or LTE or GSM), and separate radios for communicating using each of WLAN and Bluetooth. Other configurations are also possible.

Figure 3:
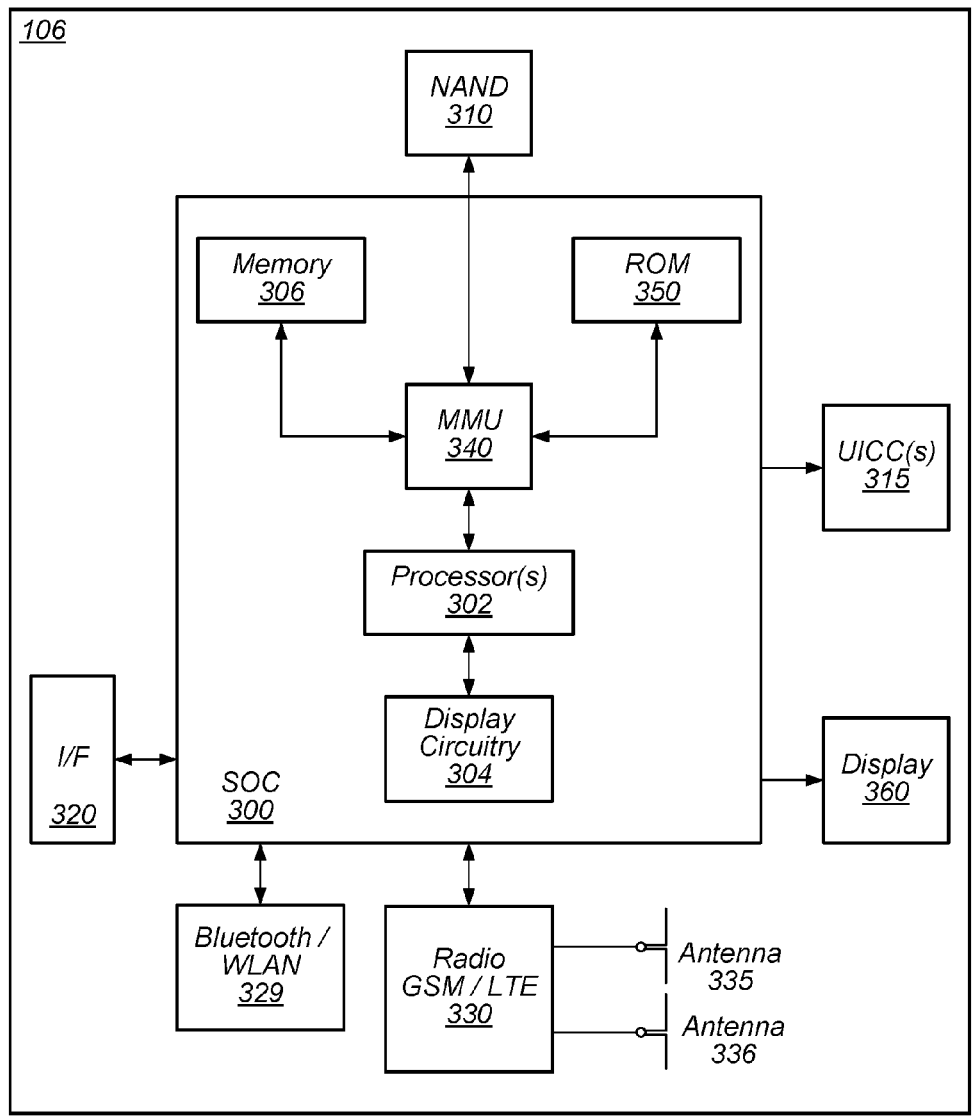
FIG. 3 illustrates an example block diagram of a mobile device.

FIG. 3—Mobile Device Block Diagram

FIG. 3 illustrates an example with simplified block diagram of a mobile device 106. As shown, the mobile device 106 may include a system on chip (SOC) 300, which may include portions for various purposes. The SOC 300 may be coupled to various other circuits of the mobile device 106. For example, the mobile device 106 may include various types of memory (e.g., including NAND flash 310), a connector interface 320 (e.g., for coupling to a computer system, dock, charging station, etc.), the display 360, cellular communication circuitry 330 such as for LTE, GSM, etc., and short range wireless communication circuitry 329 (e.g., Bluetooth™ and WLAN circuitry). The mobile device 106 may further include one or more smart cards 315 that provide SIM (Subscriber Identity Module) functionality, such as one or more UICC(s) (Universal Integrated Circuit Card(s)) cards 315. The cellular communication circuitry 330 may couple to one or more antennas, for example to two antennas 335 and 336 as shown. The short range wireless communication circuitry 329 may also couple to one or both of the antennas 335 and 336 (this connectivity is not shown for ease of illustration).

As shown, the SOC 300 may include processor(s) 302, which may execute program instructions for the mobile device 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector I/F 320, and/or display 360. The MMU 340 may be configured to perform memory protection and page table translation or set up. In some embodiments, the MMU 340 may be included as a portion of the processor(s) 302.

In one embodiment, as noted above, the mobile device 106 includes at least one smart card 315, such as a UICC 315, which executes one or more Subscriber Identity Module (SIM) applications and/or otherwise implements SIM functionality. The smart card(s) 315 may be only a single smart card 315, or the mobile device 106 may include two or more smart cards 315. Each smart card 315 may be embedded, e.g., may be soldered onto a circuit board in the mobile device 106, or each smart card 315 may be implemented as a removable smart card, an electronic SIM (eSIM), or any combination thereof. Any of various other SIM configurations are also contemplated.

As noted above, the mobile device 106 may be configured to communicate wirelessly using multiple radio access technologies (RATs). The mobile device 106 may be configured to communicate according to a WLAN RAT and/or one or more cellular RATs, e.g., such as communicating on both WLAN and cellular at the same time. For example, the mobile device 106 may be communicating on a primary communication channel (such as WLAN), and in response to detected degradation of the primary communication channel may establish a secondary communication channel (such as on cellular). The mobile device 106 may operate to dynamically establish and/or remove different primary and/or secondary communication channels as needed, e.g., to provide the best user experience while attempting to minimize cost.

As described herein, the mobile device 106 may include hardware and software components for implementing the features and methods described herein. The processor 302 of the mobile device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the mobile device 106, in conjunction with one or more of the other components 300, 304, 306, 310, 315, 320, 329, 330, 335, 336, 340, 350, 360 may be configured to implement part or all of the features described herein.

Figure 4:
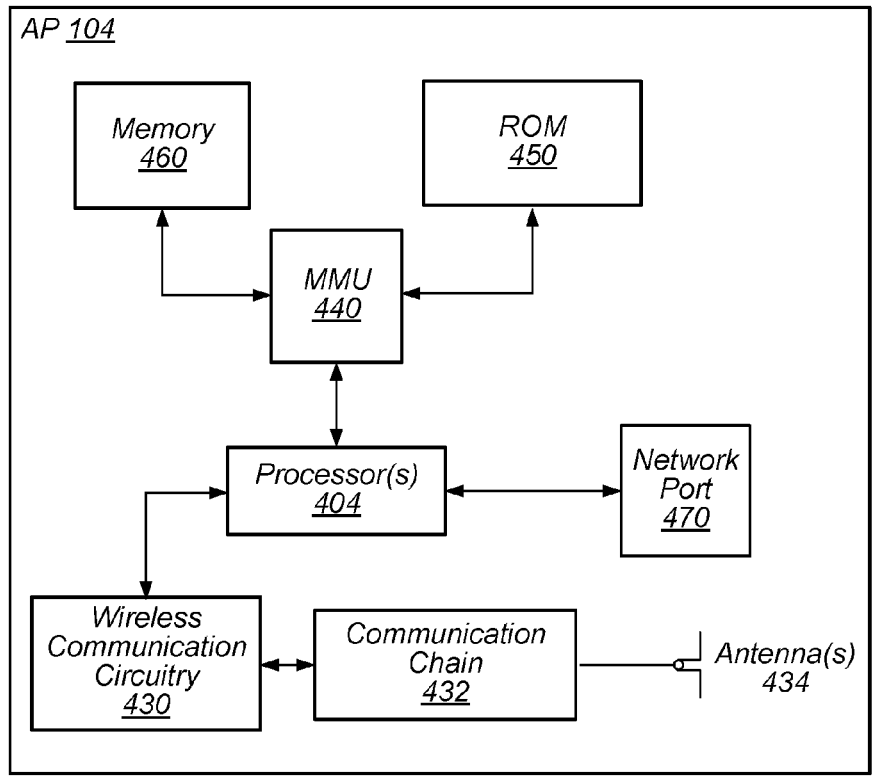
FIG. 4 illustrates an example block diagram of an access point.

FIG. 4—Exemplary Block Diagram of an Access Point

FIG. 4 illustrates an example block diagram of an access point 104. It is noted that the access point 104 of FIG. 4 is merely one example of a possible access point. As shown, the access point 104 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The access point 104 may include at least one network port 470. The network port 470 may be configured to couple to a network, such as the Internet, and provide a plurality of devices, such as mobile devices 106, access to the network as described above in FIGS. 1 and 2.

The network port 470 (or an additional network port) may also be configured to couple to a cellular network, e.g., a core network of a cellular service provider. The core network may provide mobility related services and/or other services to a plurality of devices, such as mobile devices 106. In some cases, the network port 470 may couple to a telephone network via the core network, and/or the core network may provide a telephone network (e.g., among other mobile devices serviced by the cellular service provider).

The access point 104 may include at least one antenna 434, and possibly multiple antennas. The antenna(s) 434 may be configured to operate as a wireless transceiver and may be further configured to communicate with mobile devices 106 via radio 430. The antenna(s) 434 communicates with the wireless communication circuitry 430 via communication chain 432. Communication chain 432 may be a receive chain, a transmit chain or both. The radio 430 may be configured to communicate via various wireless local area network standards, including, but not limited to WLAN.

The block diagram of FIG. 4 may also apply to cellular base station 102, except that communication may be performed using any of various cellular communication technologies instead of or in addition to WLAN.

FIG. 5—Flowchart

In order to support further deployment and usage as WLANs become more widespread (e.g., both in cellular-WLAN interworking deployments and standalone WLAN deployments, among various possible deployment scenarios), increasing WLAN communication capacity (e.g., in terms of increasing throughput, user capacity, etc.) and flexibility is an important consideration. One possible technique in support for this consideration may include introducing multi-user frame transmissions. Among the possible ways of providing such a multiple access feature, one possible technique can include utilizing transmit beamforming to generate orthogonal user signatures for the respective receiving devices, such that a single physical protocol data unit (PPDU) frame can be addressed to multiple users. However, this feature may require multiple antennas to provide beamforming capability.

Figure 5:
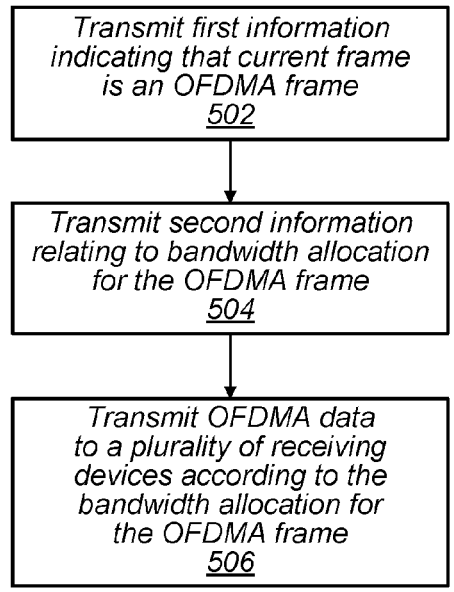
FIG. 5 is a flowchart diagram illustrating an exemplary method for performing OFDMA communication in a WLAN.

As another possibility, orthogonal frequency division multiple access (OFDMA) may be used as a technique supporting simultaneous transmissions to and/or from different devices, including for single antenna devices. FIG. 5 is a flowchart diagram illustrating a method for performing OFDMA communication in a WLAN, according to some embodiments. Aspects of the method of FIG. 5 may be implemented by a cellular base station, Wi-Fi access point, wireless user equipment device, or more generally in conjunction with any of the computer systems or devices shown in the above Figures, among other devices, as desired.

In various embodiments, some of the elements of the method shown may be performed concurrently, in a different order than shown, may be substituted for by other method elements, or may be omitted. Additional method elements may also be performed as desired. As shown, the method may operate as follows.

A first device may transmit first information indicating that a first frame (e.g., a current frame) is an OFDMA frame (502). The first information may be included in the first frame, in some embodiments. For example, the first information may be included in the physical layer (PHY) preamble of the first frame, such as in the L-SIG field or in a new HEW-SIG0 field of the PHY preamble of the first frame. As another (additional or alternative) possibility, the first information may be provided prior to transmission of the first frame; for example, the first information may be provided in a 'trigger frame', if desired.

The first device may transmit second information, which may relate to bandwidth allocation for the first frame (504). The second information may also be included in the first frame, in some embodiments. For example, the second information may be included in an HEW portion of the PHY preamble for the first frame (e.g., in an HEW-SIG1 and/or HEW-SIG2 field). If desired, the second information may alternatively (or additionally) be provided prior to transmission of the first frame, such as in a trigger frame.

The second information may indicate a total bandwidth of the first frame, in some embodiments. As one possibility, the bandwidth may be a multiple of 20 MHz (e.g., 40 MHz, 60 MHz, 80 MHz, etc.), or subbands smaller than 20 MHz. For example, the first frame may include a number of 20 MHz channels or subbands (e.g., having a 20 MHz transmit mask with guard bands between the channels) selected based on any or all of a number of destination stations for the first frame, an amount of data to be transmitted in the first frame, and any of various other considerations. Other total bandwidths and/or channel/subband bandwidths are also possible.

Additionally, the second information may indicate bandwidth allocations of the total bandwidth for the intended receiving devices of the first frame. For example, following the above-described scenario in which the total bandwidth includes a number of fixed bandwidth (e.g., 20 MHz) channels, the second information may indicate which channel(s) is (are) intended for which receiving device. Thus, the second information might indicate the destination/intended recipient of the packet provided on each channel/subband of the total bandwidth, for example by including a destination device identifier such as a partial association ID (PAID), or any other format of STA ID, of the destination device in the HEW-SIG1 field of the PHY preamble on a per channel/subband basis, as one possibility. Note that in such a scenario, multiple channels/subbands of the total bandwidth (which may not necessarily be continuous in frequency) may be allocated to a single destination device, if desired. For example, a first channel and a second channel (or first and third, second and third, etc.) of the first frame might be associated with the same destination device. Other frameworks for indicating which bandwidth portions (including frameworks in which dynamic/non-fixed bandwidth allocations are possible) are allocated to which receiving devices are also possible.

Further, it should be noted that different modulation and coding schemes (MCS) may be used for different channels of the total bandwidth of the first frame, if desired, for example depending on differing channel conditions for different destination devices. In such a case, MCS allocations for the first frame may also be indicated to the destination devices as part of the second information. For example, the second information may (e.g., in the PHY preamble) include an indication of the MCS used with each portion of the total bandwidth (e.g., each 20 MHz channel, or other bandwidth allocation). Likewise, coding bits and/or beamforming may be different per bandwidth portion, and indications of channel and/or packet specific coding bits and/or beamforming configurations may be provided in association with each channel and/or each packet included in the first frame, if desired.

As noted above, the first frame may include a PHY preamble, which may include the first information and/or the second information, among other possible information. Note that in some instances, it may be the case that one portion of the PHY preamble is identical across the bandwidth of the first frame, while another portion of the PHY preamble differs between two or more channels/subbands of the first frame. The first frame may also include payload/data for any/all of the destination devices. Thus, the first device may transmit OFDMA data to multiple receiving devices according to the bandwidth allocation for the first frame (506).

At least in some embodiments, if the data/payload lengths are different for different bandwidth portions of the first frame (e.g., for different users/destination devices), padding (e.g., zeros appended to the data) may be added to some or all of the data portions such that transmission of signals on all bandwidth portions of the total bandwidth is completed simultaneously or substantially simultaneously. For example, a target packet length (such as a packet length associated with the packet to be transmitted that has the longest payload portion) for packets included in the frame may be determined, and the payload of any packets less than that length may be padded to match the target packet length.

In some embodiments, in response to the first frame, each respective recipient of the intended recipients of the first frame may transmit acknowledgement information (e.g., indicating successful reception) if the data for the respective recipient is successfully received and decoded. The first device may accordingly receive acknowledgement information from the recipient devices in response to the first frame.

FIGS. 6-10—Additional Information

FIGS. 6-10 and the information provided herein below in conjunction therewith are provided by way of example of various considerations and details relating to possible systems in which the method of FIG. 5 and/or other aspects of this disclosure may be implemented, and are not intended to be limiting to the disclosure as a whole. Numerous variations and alternatives to the details provided herein below are possible and should be considered within the scope of the disclosure.

IEEE 802.11 is a set of media access control (MAC) and physical layer (PHY) specifications for implementing WLAN communication. 802.11ac introduced a new feature for downlink multi-user frame transmissions (downlink MU-MIMO) where frames addressed to several users (up to a maximum of 4) may be transmitted simultaneously in a single PPDU frame. Based on transmit beam forming, orthogonal user signatures are generated by the transmitting device using multiple antennas. However, this feature cannot be enabled if the transmitter has a single antenna.

Orthogonal Frequency Division Multiple Access (OFDMA) may be useful in optimizing bandwidth use for WLAN communication. OFDMA may be useful for transmitters having a single antenna, e.g., allowing simultaneous transmissions to/from different users even when the transmitting device is a single antenna device.

In some embodiments, OFDMA may be implemented and may be indicated by using one or more bits in a PHY signal field and/or using a trigger frame, among other possibilities. For example, a new bit in the PHY signal field may indicate that the current frame is being transmitted in OFDMA mode. Additionally, an OFDMA PHY structure may be implemented for handling communications to and/or from multiple recipients.

Figure 6:
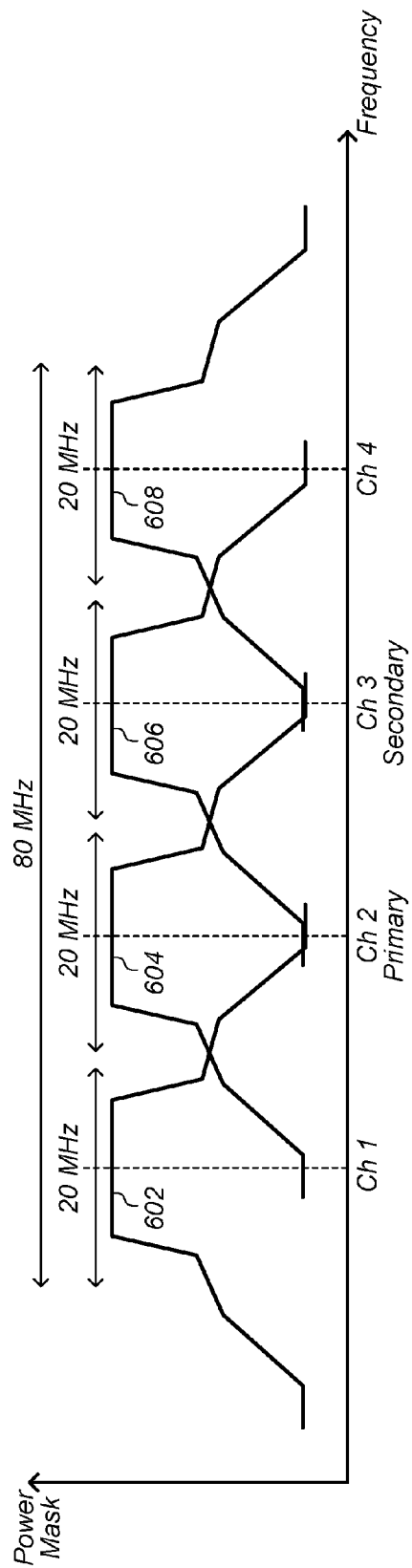
FIG. 6 illustrates an example spectral transmit mask configuration for WLAN OFDMA communication.

In some embodiments, as shown in FIG. 6, the OFDMA mode may operate in units of 20 MHz (e.g., resource block size=20 MHz) with a 20 MHz spectral transmit mask. However, it should be noted that the 20 MHz size is exemplary only, and others sizes are envisioned, such as 2.5, 5, 10, 15, 30, 40, 60, 80, and 100 MHz, and/or other values. The total bandwidth in this example is shown as 80 MHz (e.g., including four 20 MHz channels 602, 604, 606, 608), although other values of the total bandwidth are also envisioned.

Figure 7:
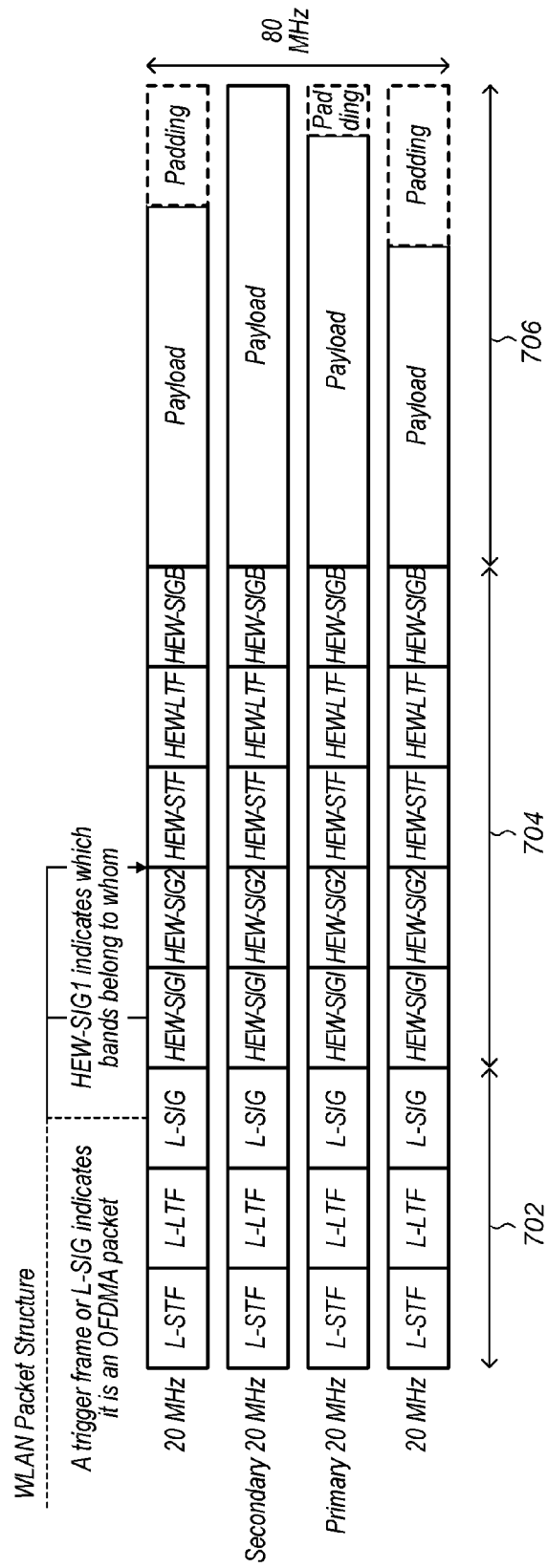
FIG. 7 illustrates an example WLAN OFDMA packet structure.

As shown in FIG. 7, in one embodiment, the preamble structure of an OFDMA WLAN frame may have two parts: a legacy portion (702, including L-STF, L-LTF, and L-SIG) and a HEW portion (704, including HEW-SIG1 and HEW-SIG2). The legacy portion of a PHY preamble may include the same signal in each 20 MHz band. In one embodiment, there may be an indication in L-SIG, to indicate OFDMA operation (e.g., common for all bands, e.g., all four bands when using an 80 MHz bandwidth with 20 MHz resource block size). Alternatively, or additionally, as indicated above, one or more of these values may be indicated before transmission of the current frame, e.g., using a trigger frame.

The HEW portion 704 of the preamble may include bandwidth (BW) bits that may be set to indicate total BW (in this example, for 80 MHz), e.g., common for all 4 bands. The partial association ID (PAID) may indicate the recipient for each 20 MHz band, which may be different per 20 MHz channel. However, for channels used by the same device, the PAID may be the same.

The waveforms of a legacy portion for each 20 MHz band may be identical. Further, a length information field may include the maximum length of OFDMA packets being transmitted in each band. For example, if the length of the OFDMA packets (or payload) in a first band is shorter than that of the OFDMA packets (or payload) being transmitted in another band, one or more zeros can be appended to (pad) the payload to keep the same length across the payloads of all of the bands.

As also shown in FIG. 7, the HEW preamble portion 704 may also include HEW-STF, HEW-LTF, and HEW-SIGB fields; the WLAN frame may also include payload portions 706 (e.g., including padding, as desired).

As discussed above, a trigger frame (e.g., a separate PHY transmission), or an indication included as part of the OFDMA frame (such as an OFDMA-indicator bit included as part of a 90 degree rotated group of bits in a PHY preamble field such as the L-SIG) may indicate the packet or frame is an OFDMA communication. As one possibility for indicating destination information, the PAID bit(s) in HEW-SIG1 (e.g., 9 bits) may indicate the destination of the packet by Partial AID, which may be different per 20 MHz band.

Other subfields may be used for indications, e.g., BW bit(s) may indicate the total BW to operate (e.g., in this example, set to 80 MHz). MCS and Coding bit(s) may be set differently for some/all 20 MHz bands (depending on destination stations (STAs)). In some embodiments, all bands associated with the OFDMA frame may use transmit masks having the same width (e.g., 20 MHz). Thus, in some instances, there may be a guard band between any or all of the bands, even if an STA is operating in multiple bands (e.g., using two 20 MHz bands for 40 MHz total).

Figure 8:
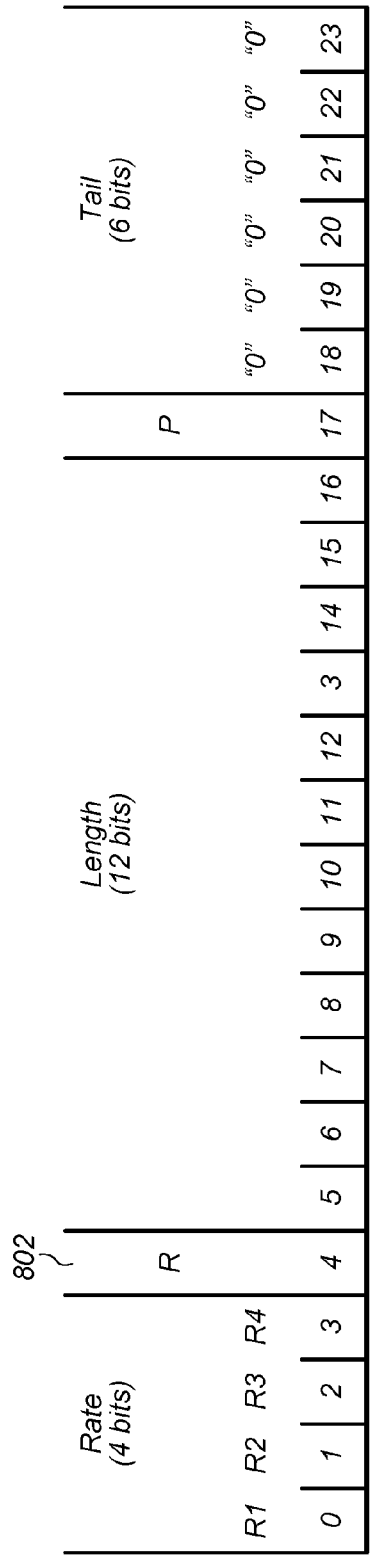
FIG. 8 illustrates an example L-SIG format.

OFDMA operation may be indicated in a variety of manners, as indicated above. For higher MAC efficiency, an OFDMA frame indication can be signaled in the PHY preamble, e.g., one reserved bit in L-SIG can be re-defined, and/or additional bits (e.g., four) in L-SIG field can be used. In some embodiments, these additional bits are not coded, providing backward compatibility with legacy devices, however may be repeated multiple times (e.g., four). Additionally, as the L-SIG may be received after the L-LTF, a training sequence available from the L-LTF may be used for channel estimation, in turn allowing coherent demodulation of these bits. Alternatively, or additionally, a new HEW-SIG0 field (e.g., a field that is 1 OFDM symbol long with 24 information bits, which may be located before a HEW-SIG1 field) can be added and can include an OFDMA indication bit, if desired. The format of L-SIG, showing the available bit 4 (802), is illustrated in FIG. 8.

Figure 9:
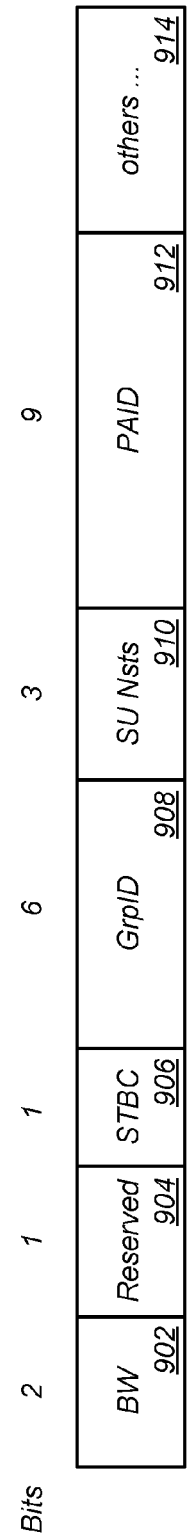
FIG. 9 illustrates an example HEW-SIG1 format.

As shown in FIG. 9, according to some embodiments, the HEW-SIG1 field may include one or more bits for BW 902 (e.g., 2), one or more reserved bits 904 (e.g., 1), one or more STBC bits 906 (e.g., 1), one or more group ID bits 908 (e.g., 6), one or more SU Nsts 910 (e.g., 3), one or more PAID bits 912 (e.g., 9), and/or one or more additional bits and/or fields 914.

PAID bits may be used to indicate the destination corresponding to each band (e.g., each 20 MHz block in the example discussed above). When the frame is not an OFDM frame, PAID has the same definition as in legacy communication (e.g., 802.11ac). However, when a frame is an OFDM frame: the BW bit(s) may indicate the total BW to operate with OFDMA (e.g., same across the total BW); the group ID may be set for SU operation (e.g., 63); for each 20 MHz band, PAID may indicate the recipient of the frame within the band; and when some 20 MHz bands contain the same PAID, it can indicate that the recipient has a larger BW allocation (e.g., 40, 60, 80 MHz, or other multiples of the allocation size). Note that an allocation of multiple 20 MHz bands to a single recipient does not have to be contiguous in frequency. Other subfields (e.g., STBC, SU Nsts, or other bits in 802.11ax-SIG2 or 802.11ax-SIGB) may define other control signals for a 20 MHz band. Further, each 20 MHz band may have one or more of: different coding, a different MCS, and/or a different beamformed indication.

Figure 10:
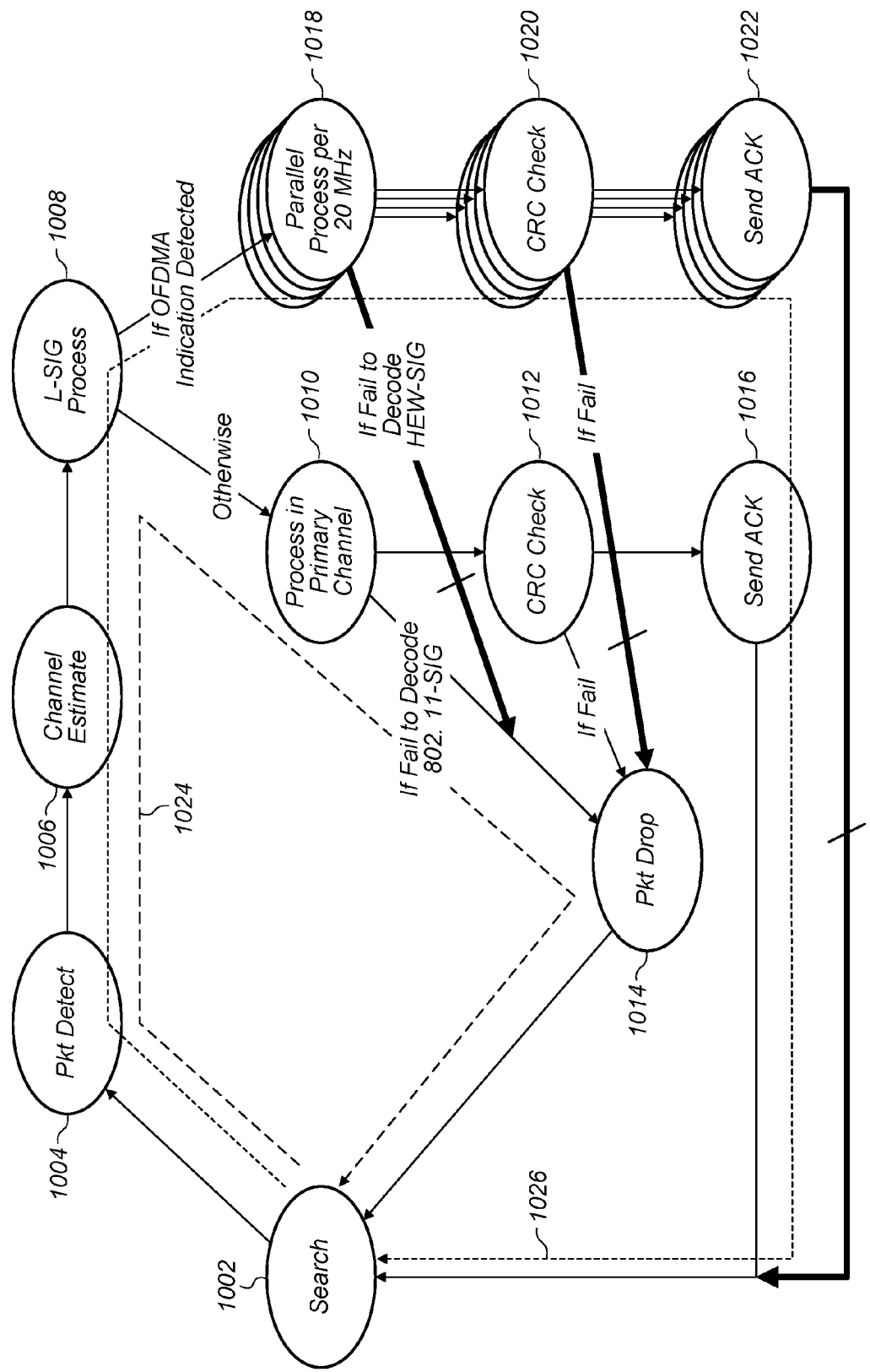
FIG. 10 is an example state diagram for a device receiving WLAN OFDMA communication.

FIG. 10 illustrates an exemplary receiving device state diagram. In particular, this state diagram indicates the flow of states for both legacy devices (e.g., the flow indicated as path 1024) and OFDMA compatible devices (e.g., the flow indicated as path 1026) when an OFDMA frame is transmitted. Both devices initially begin in the search state 1002, followed by packet detection 1004 and channel estimate 1006 states. These states may be based on the legacy portion of the preamble discussed above. At the L-SIG process 1008, the two devices deviate. In particular, the legacy device may enter the "process in primary channel" state 1010, and because it is an OFDMA packet/frame, it may be likely that it will fail to decode and continue to the packet drop state 1014, from which the device may return to the search state 1002. If the legacy device makes it through the processing state without failing, it may be likely to fail at the CRC check state 1012. If the CRC check passes, the device may continue to the send ACK state 1016 and subsequently return to the search state 1002. On the other hand, the OFDMA compatible device may perform parallel processing for its respective channel(s) 1018, perform CRC checks 1020 if preamble decoding is successful (or continue to packet drop 1014 if preamble decoding is unsuccessful), and if CRC checks pass, send an acknowledgement (or multiple acknowledgements) 1022 (or continue to packet drop 1014 if the CRC check fails), and return to the search state 1002. When the packet is not an OFDMA packet, the normal legacy path may be followed by both sets of devices.

In the following further exemplary embodiments are provided.

One set of embodiments may include a method for performing OFDMA communication in a WLAN, including: at a transmitting device: transmitting first information to multiple receiving devices over the WLAN indicating that a current frame is an OFDMA frame; transmitting second information to each of the multiple receiving devices indicating respective channel information regarding one or more channels of the WLAN bandwidth associated with the respective receiving device; transmitting data to each of the multiple receiving devices according to the channel information comprised in the second information.

According to some embodiments, the transmitting device includes an access point.

According to some embodiments, the first information is included in the current frame.

According to some embodiments, the first information is included in a previous frame.

According to some embodiments, the channel information indicates modulation and coding information.

According to some embodiments, the channel information indicates allocated bandwidth information.

According to some embodiments, the channel information includes information identifying the respective device.

According to some embodiments, the information identifying the respective device includes a partial association ID (PAID).

A further set of embodiments may include a transmitting device, configured to perform the method of any of the preceding examples, including: at least one antenna; a first radio, wherein the first radio is configured to perform WLAN communication with the plurality of receiving devices; and at least one processor coupled to the first radios.

A still further set of embodiments may include a non-transitory, computer accessible memory medium storing program instructions executable to perform a method according to any of the preceding examples.

Yet another set of embodiments may include a method for performing OFDMA communication in a WLAN, including: at a transmitting device: determining a desired packet length for a transmission to multiple receiving devices; generating a packet for each of the multiple receiving devices having the desired packet length; concurrently transmitting the plurality of packets to the receiving devices using OFDMA; and receiving information including a plurality of acknowledgements from the receiving devices corresponding to the plurality of packets transmitted to the receiving devices, wherein the plurality of acknowledgements were transmitted concurrently; and processing the information to determine which of the receiving devices transmitted acknowledgements.

According to some embodiments, generating the packet includes padding a plurality of packets to match the desired packet length.

According to some embodiments, padding the plurality of packets comprises adding 0s to the data to match the desired packet length.

Embodiments of the present application may be realized in any of various forms. For example, various described embodiments may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs. For example, some or all of the units included in the UE may be implemented as ASICs, FPGAs, or any other suitable hardware components or modules.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
   an antenna;
   a radio operably coupled to the antenna; and
   a processing element operably coupled to the radio;
   wherein the antenna, radio, and processing element are configured to:
      transmit first information to a plurality of receiving devices over a wireless local area network (WLAN) indicating that a first frame comprises an orthogonal frequency division multiple access (OFDMA) frame, wherein the first information is included in a legacy portion of a PHY preamble of the first frame;
      transmit channel information corresponding to the first frame to each respective receiving device of the plurality of receiving devices, wherein the channel information associated with each respective receiving device indicates a bandwidth allocation to the respective receiving device for the first frame; and
      transmit the first frame, comprising transmitting data to each of the plurality of receiving devices according to the indicated bandwidth allocations.

2. The wireless device of claim 1,
wherein the first frame comprises a transmission across a plurality of fixed bandwidth channels,
wherein the channel information indicates an intended recipient for each of the plurality of fixed bandwidth channels.

3. The wireless device of claim 2,
wherein the channel information further comprises modulation and coding information for each of the plurality of fixed bandwidth channels.

4. The wireless device of claim 1, wherein the antenna, radio, and processing element are further configured to:
include padding in data transmitted to at least one of the plurality of receiving devices as part of the first frame to generate a packet equal in length to that of a packet transmitted to at least one other of the plurality of devices as part of the first frame.

5. A method for performing orthogonal frequency division multiple access (OFDMA) communication in a wireless local area network (WLAN), comprising:
at a transmitting device:
transmitting first information to a plurality of destination devices over the WLAN indicating that a current frame is an OFDMA frame;
transmitting second information to the plurality of destination devices, wherein the second information comprises channel allocation information indicating a destination device for each of a plurality of channels of the current frame;
wherein the first information is included in a legacy portion of a PHY preamble of the current frame; and
transmitting the current frame, comprising transmitting data to the plurality of destination devices according to the channel allocation information included in the second information.

6. The method of claim 5,
wherein the second information is included in the current frame.

7. The method of claim 5,
wherein the second information is included in a frame transmitted prior to the current frame.

8. The method of claim 5,
wherein the second information further comprises modulation and coding information indicating a modulation and coding scheme for each of the plurality of channels of the current frame.

9. The method of claim 5, wherein the channel allocation information indicating the destination device for each of the plurality of channels of the current frame comprises a partial association ID (PAID) for each of the plurality of channels.

10. The method of claim 5,
wherein signals transmitted on each of the plurality of channels of the current frame terminate in a time synchronized manner.

11. The method of claim 5,
wherein a guard band is used between each adjacent pair of channels of the plurality of channels of the current frame.

12. The method of claim 5,
wherein at least a first channel and a second channel of the plurality of channels of the current frame are associated with the same destination device.

13. The wireless device of claim 1, wherein the channel information comprises a partial association ID (PAID) for each of the plurality of channels.

14. The method of claim 5,
wherein the second information further comprises a beamforming indication for each of the plurality of channels of the current frame.

15. The method of claim 5, wherein the current frame is transmitted over a total bandwidth comprising the plurality of channels.

16. The method of claim 15, wherein respective data for each respective destination device of the plurality of destination devices is transmitted on a respective one of the plurality of channels.

17. The method of claim 16, wherein the channel allocation information comprises an indication of the respective destination device for the respective data transmitted on the respective one of the plurality of channels.

18. The method of claim 15,
wherein a first portion of a PHY preamble of the current frame is identical across a total bandwidth of the current frame, and
wherein a second portion of the PHY preamble of the current frame differs between at least two channels corresponding to the current frame.

19. The method of claim 5, wherein transmitting the current frame further comprises:
including padding in the data transmitted to at least one of the plurality of destination devices.

20. The method of claim 6, the method further comprising: transmitting an indication of a total bandwidth of the current frame.

* * * * *